United States Patent [19]

Yamasaki

[11] 4,408,852
[45] Oct. 11, 1983

[54] AUTOMATIC EXPOSURE CONTROLLER FOR CAMERA OF TTL DIRECT PHOTOMETRY TYPE

[75] Inventor: Masafumi Yamasaki, Hachioji, Japan

[73] Assignee: Olympus Optical Company Ltd., Japan

[21] Appl. No.: 322,853

[22] Filed: Nov. 19, 1981

[30] Foreign Application Priority Data

Dec. 5, 1980 [JP] Japan .................................. 55-172452
Feb. 23, 1981 [JP] Japan .................................. 56-025759

[51] Int. Cl.³ .............................................. G03B 7/08
[52] U.S. Cl. .......................................... 354/24; 354/51
[58] Field of Search .......................................... 354/24

[56] References Cited

U.S. PATENT DOCUMENTS 4,072,961  2/1978  Yamada ................................. 354/24
4,303,318  12/1981  Kitauva et al. ....................... 354/24
4,325,615  4/1982  Yamada ................................. 354/24

FOREIGN PATENT DOCUMENTS 53-46724  4/1978  Japan .

*Primary Examiner*—Russell E. Adams
*Attorney, Agent, or Firm*—Ostrolenk, Faber, Gerb & Soffen

[57] ABSTRACT

Automatic exposure controller for camera of TTL direct photometry type forms a difference between a photometric value which is obtained by determining a fixed reflection from only a first blind surface at the initiation of running of a first shutter blind and a photometric value which varies as the first blind runs, and applies the difference voltage to the base of transistor which forms a logarithmic expansion circuit. Simultaneously, the photometric value which varies as the first blind runs is applied to the emitter of the transistor. In this manner, until shutter is fully open, the logarithmic expansion circuit produces an output current of a constant magnitude while after the shutter is fully open, the voltage applied to the base is maintained constant so that the output current of the logarithmic expansion circuit varies in accordance with the brightness of an object being photographed.

6 Claims, 8 Drawing Figures

AUTOMATIC EXPOSURE CONTROLLER FOR CAMERA OF TTL DIRECT PHOTOMETRY TYPE

BACKGROUND OF THE INVENTION

The invention relates to an automatic exposure controller for camera of TTL direct photometry type, and more particularly, to an automatic exposure controller for use in a camera of TTL direct photometry type in which light from an object being photographed which is reflected from both or either one of a shutter blind surface and a film surface is measured to determine a proper exposure period automatically.

A photometric device used in a camera of TTL photometry type determines light from an object being photographed which is incident on a film through a taking lens, for the purpose of providing a proper exposure. Ideally, the photometry should be performed by a photometric, photoelectric transducer element which is located on a film surface or on a point equivalent thereto, for example, on a shutter blind surface which is used in a focal plane shutter. This is infeasible in practice, and hence a technique is usually employed which determines light from an object being photographed which is reflected by a film surface or a shutter blind surface which is equivalent thereto, and this technique is commonly referred to as TTL direct photometry. FIG. 1 shows an exemplary arrangement of a camera of such photometry type. Below a movable mirror 1 and at a location out of a taking light path is a photometric or photoelectric transducer element 4 which is disposed so as to be opposite a first shutter blind 2 and a film 3. As the movable mirror 1 moves upward to a phantom line position 1A, the light passing through a taking lens 8, which previously been fed through a focussing glass 5, a pentaprism 6 and eyepiece 7 for observation by a photographer, is now directed to the first shutter blind 2, which reflects such light for photometry by the transducer element 4. Subsequently, as the first blind 2 begins to run to expose the film 3, the transducer element 4 also determines reflected light from the photosensitive surface of the film 3. An exposure control is achieved in response to a photometric output from the transducer element 4.

As is well recognized, where a focal plane shutter utilizes blinds, the film surface is initially covered by the first shutter blind which is formed by black cloth. As the first blind moves across an image field in response to a shutter release operation, the film surface which has been covered by the first blind becomes exposed. After a proper exposure period, a second shutter blind which is also formed by a black cloth begins to cover the exposed film surface again.

During a high speed shutter operation, the second blind begins running while the first blind is still running, thereby enabling a reduced exposure period to be obtained. It will be recognized that as the exposure period reduces, the width of a slit defined by the first and the second blind also reduces. When a proper exposure is to be determined by photometry of light from an object being photographed which light is reflected by both the first shutter blind of the blind shutter operating in the manner mentioned above and by the film surface, reflected light from the running first blind surface is initially measured, followed by the measurement of reflected light from the film surface which is being exposed. However, because of difference in the reflectivity of the blind surface and the film surface, the amount of light incident on the transducer element 4 changes significantly as shown in FIG. 2, as the first blind runs. Specifically, at time $t_1$ which is near the beginning of the running of the first blind, the amount of light incident on transducer element 4 is at a low level $l_1$, and increases as the blind continues to run until it reaches a higher level $l_2$ at time $t_2$ when the running of the first blind is completed. This is attributable to the fact that the blind surface is darker than the film surface, on the order of approximately three steps of EV-values. Thus it will be apparent that accurate exposure period cannot be calculated by directly integrating a photocurrent produced by the transducer element 4 in proportion to the amount of incident light.

In a conventional exposure control circuit, a technique is employed to assure a uniform photocurrent produced by the transducer element 4 independently of the position of running of the shutter blind, as by providing substantially equal reflectivity for the blind surface and for the film surface. However, to practice this technique, a material exhibiting the same reflectivity as the film surface is printed on the first blind surface in a given pattern. However, a shutter blind has its front surface formed by a cloth and its rear surface by a rubber-lined cloth, and this makes it very difficult to treat the surface as by printing in the manner mentioned above, resulting in a very expensive arrangement. In addition, the pattern being printed may change from product to product, causing a variation in the reflectivity. Furthermore, since a shutter blind is wound up at a high rate, the blind surface has a poor planarity, which may cause the patterned printing to be exfoliated, presenting a problem of maintenance.

Additionally, in order to reduce the incidence of stray light rays into the mirror box, leakage of light onto a film or to prevent a ghost or flare from occurring, cameras are usually internally provided with a black delustering printing. It will be seen that printing a reflecting pattern on the first blind surface interfers with the extinction effect of such delustering printing, giving rise to the occurrence of ghost and flare. Moreover, the reflectivity of the film surface changes slightly from film to film, and hence there occurs a varying difference in the reflectivity between the blind surface and the film surface as the film is changed. This produces an error, though small, in the exposure.

To provide an automatic exposure control which corrects for an error in the exposure resulting from the differential reflectivity of the film, a prior art includes an arrangement (see Japanese Laid-Open Patent Application No. 46,724/1978) including a first photometric circuit which is used for exposure control, and a second photometric circuit which is used to correct for a differential reflectivity of the film. There is provided light emitting element which directs its light to the film, the reflection from which is determined by the second photometric circuit to provide a photometric output, which is used to correct the magnitude of an exposure control output from the first photometric circuit. However, this arrangement requires a pair of photometric elements and a complex circuit arrangement, resulting in an increased cost.

SUMMARY OF THE INVENTION

In view of the foregoing, it is an object of the invention to provide an automatic exposure controller for camera of TTL direct photometry type including a logarithmic expansion transistor which is controlled by any change between a stored value of logarithmically compressed photometric output which corresponds to the brightness of an object being photographed at the time a movable mirror has moved up and a photometric output which is produced as a first shutter blind runs and which operates to maintain a constant integrating current during the running of the first shutter blind and in which the change is fixed at the time when the first shutter blind has completed its running, thereby allowing the integrating current to vary in accordance with the brightness of the object being photographed.

It is another object of the invention to provide an automatic exposure controller for camera of TTL direct photometry type including a logarithmic expansion transistor which is controlled by any change between a stored value of logarithmically compressed photometric output corresponding to the brightness of an object being photographed obtained at the time when a movable mirror has moved up and a photometric output which is produced as a first shutter blind runs so as to maintain a constant integrating current during the running of the first shutter blind and in which the change is adjusted by a voltage, at the completion of running of the first shutter blind, which is developed in accordance with the reflectivity of a film being loaded into a camera which is determined by performing an exposure of an initial portion of the film preceding the first frame, thus allowing the integrating current to vary in accordance with the brightness of the object being photographed.

In accordance with the invention, a difference in the reflectivity between the shutter blind surface and the film surface which reflects itself as a change in the brightness of an object being photographed during the time the first shutter blind runs is introduced into a correction to the logarithmic expansion transistor in order to maintain a constant integrating current. At the completion of running of the first blind, the integrating current is allowed to vary in accordance with the brightness of the object being photographed. Accordingly, a shutter can be closed with an accurate exposure period dependent on the brightness of the object being photographed, without being influenced by differential reflectivities of the shutter blind surface and the film surface. In this manner, a picture can be satisfactorily taken with TTL direct photometry. According to another aspect of the invention, at the completion of running of the first blind, the base potential of the transistor may be maintained at a level which depends on the ratio of reflectivity between the shutter blind surface and the film surface and which is prestored at the time the film is loaded, thus allowing the integrating current to vary in accordance with the brightness of the object being photographed. Hence, the shutter may be closed with an accurate exposure period dependent on the brightness of the object without being influenced by differential reflectivity of the shutter blind surface and the film surface, thus permitting a satisfactory photographing operation with the TTL direct photometry. It is to be noted that such operation can be achieved without requiring any manual switching or any correction mechanism which compensates for the differential reflectivity of the film, but any difference in the reflectivity of the film and the resulting error in the exposure is automatically corrected.

DESCRIPTION OF PREFERRED EMBODIMENTS

Figure 1:
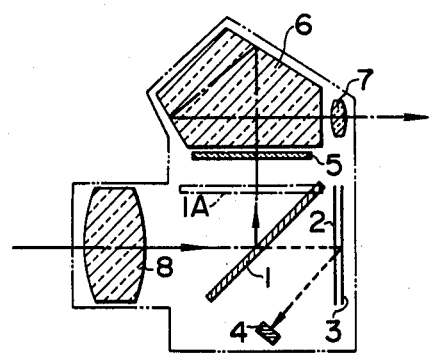
FIG. 1 is a schematic cross section of a camera of TTL direct photometry type.
Figure 2:
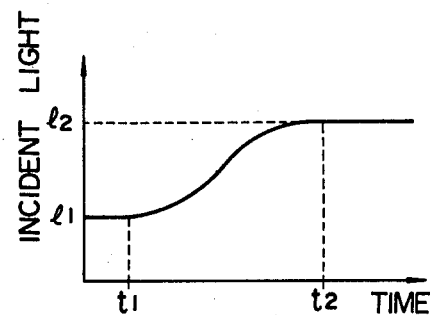
FIG. 2 graphically shows the amount of incident light on a photoelectric transducer element, plotted against the time during which a first shutter blind runs when a shutter blind surface has a different reflectivity from a film surface.
Figure 3:
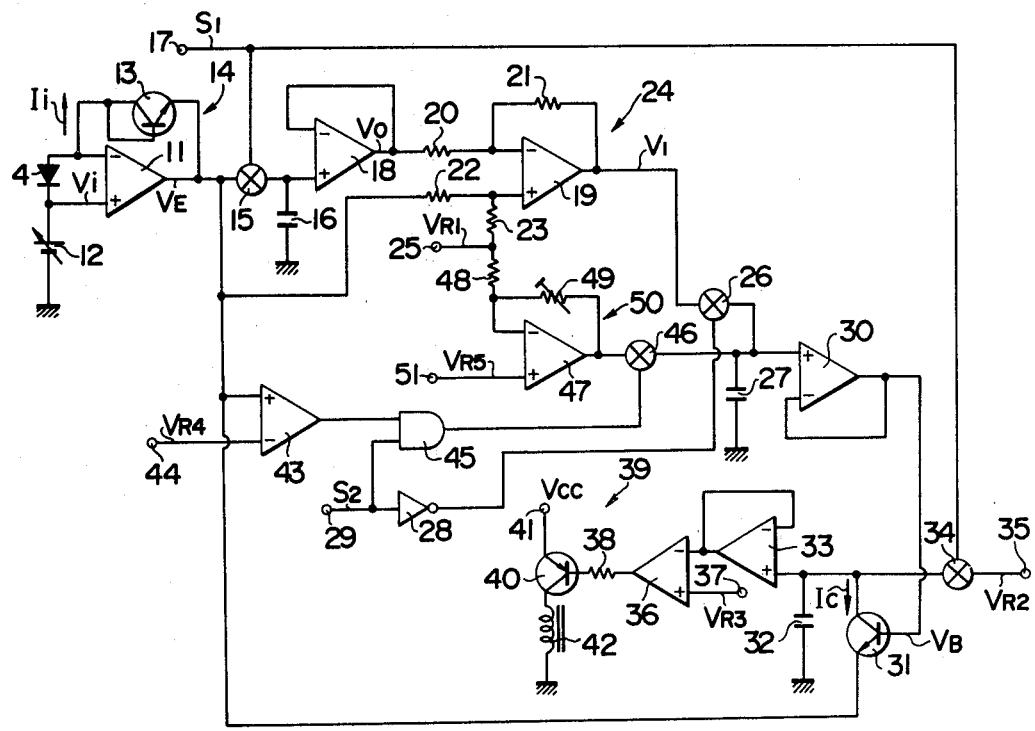
FIG. 3 is a circuit diagram of an automatic exposure controller according to one embodiment of the invention.

Referring to FIG. 3, there is shown a circuit diagram of an automatic exposure controller according to one embodiment of the invention. In FIG. 3, a photoelectric transducer element 4 which is used for purpose of photometry is disposed in opposing relationship with a first shutter blind 2 and a film 3 in a camera of TTL direct photometry type, in a manner as illustrated in FIG. 1. The transducer element 4 is connected across both inputs of an operational amplifier 11, with its cathode connected to the non-inverting input terminal thereof and also connected to ground through a source of variable voltage 12 which is utilized to preset exposure input information such as film speed. An NPN transistor 13 has its base and collector connected together and connected to the inverting input terminal and its emitter connected to the output terminal of the operational amplifier 11, thus forming a logarithmic compression circuit 14 which produces a voltage corresponding to a logarithm of the amount of incident light on the transducer element 4, which voltage is developed at the output terminal of the operational amplifier 11. The output terminal of the operational amplifier 11 is connected through an analog switch 15 to one end of a storage capacitor 16, the other end of which is connected to ground. The analog switch 16 includes a control input terminal which is connected to a terminal 17, to which a control signal S1 is applied. As will be described later, the control signal S1 is produced by an analog switch control circuit shown in FIG. 4, and changes from its "H" to its "L" level at the completion of upward movement of the movable mirror 1 (see FIG. 1). The one end of the capacitor 16 is connected to a non-inverting input terminal of an operational amplifier 18, the inverting input terminal of which is connected to an output terminal thereof, thus forming an impedance converter having a gain of unity and exhibiting a high input and a low output impedance. The output terminal of the operational amplifier 18 is connected through a resistor 20 to the inverting input terminal of a subtraction circuit 24 which is formed by an operational amplifier 19 and resistors 20 to 23. The operational amplifier 19 includes a non-inverting input terminal, which is connected through a resistor 22 to the output terminal of the operational amplifier 11. A resistor 21 is connected across the inverting input terminal and the output terminal of the operational amplifier 19, and the non-inverting input terminal is also connected through a resistor 23 to a terminal 25, to which a reference voltage VR1 is applied. It is to be noted that these resistors 20 to 23 have resistances which are defined by the equality R20=R22=R23. Accordingly, the subtraction circuit 24 develops at the output terminal of the operational amplifier 19 a change between the output voltage of the operational amplifier 11 which is applied to the non-inverting input terminal thereof and the output voltage from the operational amplifier 18 which is applied to the inverting input terminal thereof, as a difference over the reference voltage VR1.

The output terminal of the operational amplifier 19 is connected through an analog switch 26 to one end of a capacitor 27, the other end of which is connected to ground. The analog switch 26 includes a control input terminal which is connected through an inverter 28 to a terminal 29, to which a control signal S2 is applied. The control signal S2 is produced by the analog switch control circuit shown in FIG. 4, and changes from its "L" to "H" level at the completion of running of the first shutter blind, as will be further described later. The one end of the capacitor 27 is connected to the non-inverting input terminal of an operational amplifier 30, the inverting input terminal of which is connected to the output terminal thereof, thus forming an impedance converter. The output terminal of the operational amplifier 30 is connected to the base of an NPN transistor 31 which is used to provide a logarithmic expansion. The transistor 31 has its collector connected to one end of an integrating capacitor 32 having its other end connected to ground, and its emitter connected to the output terminal of the operational amplifier 11 contained in the logarithmic compression circuit 14. The integrating capacitor 32 is used to determine an exposure period. The one end of the capacitor 32 is connected to the non-inverting input terminal of an operational amplifier 33, the inverting input terminal of which is connected to the output terminal thereof to form an impedance converter. In addition, the non-inverting input terminal of the operational amplifier 33 is connected through an analog switch 34 to a terminal 35, to which a reference voltage VR2 is applied. The analog switch 34 includes a control input terminal which is connected to the terminal 17 so as to receive the control signal S1 in the same manner as the analog switch 15. The output terminal of the operational amplifier 33 is connected to the inverting input terminal of a comparator 36, the non-inverting input terminal of which is connected to a terminal 37, to which a reference voltage VR3 is applied for use in the level determination. The output terminal of the comparator 36 is connected through a resistor 38 to the base of a PNP switching transistor 40 which is included in a shutter control circuit 39. The emitter of the transistor 40 is connected to a terminal 41, to which a supply voltage Vcc is applied while the collector is connected to the ground through an electromagnet 42 which serves maintaining a second shutter blind against running.

A comparator 43 is provided in order to determine the brightness of an object being photographed, and includes an inverting input terminal connected to a terminal 44, to which a reference voltage VR4 is applied. The non-inverting input terminal of the comparator 43 is connected to the output terminal of the operational amplifier 11 in the logarithmic compression circuit 14. The output terminal of the comparator 43 is connected to one input of AND gate 45, the other input of which is connected to the terminal 29, to which the control signal S2 is applied. The output terminal of AND gate 45 is connected to the control input terminal of an analog switch 46 which is in turn connected between the non-inverting input terminal of the operational amplifier 30 and the output terminal of an operational amplifier 47, which forms a reflectivity correction circuit 50 together with resistors 48, 49. The non-inverting input terminal of the operational amplifier 47 is connected to a terminal 51, to which a reference voltage VR5 is applied while the inverting input terminal is connected through resistor 48 to the terminal 25, to which the reference voltage VR1 is applied. A semi-fixed resistor 49 is connected across the inverting input terminal and the output terminal.

Figure 4:
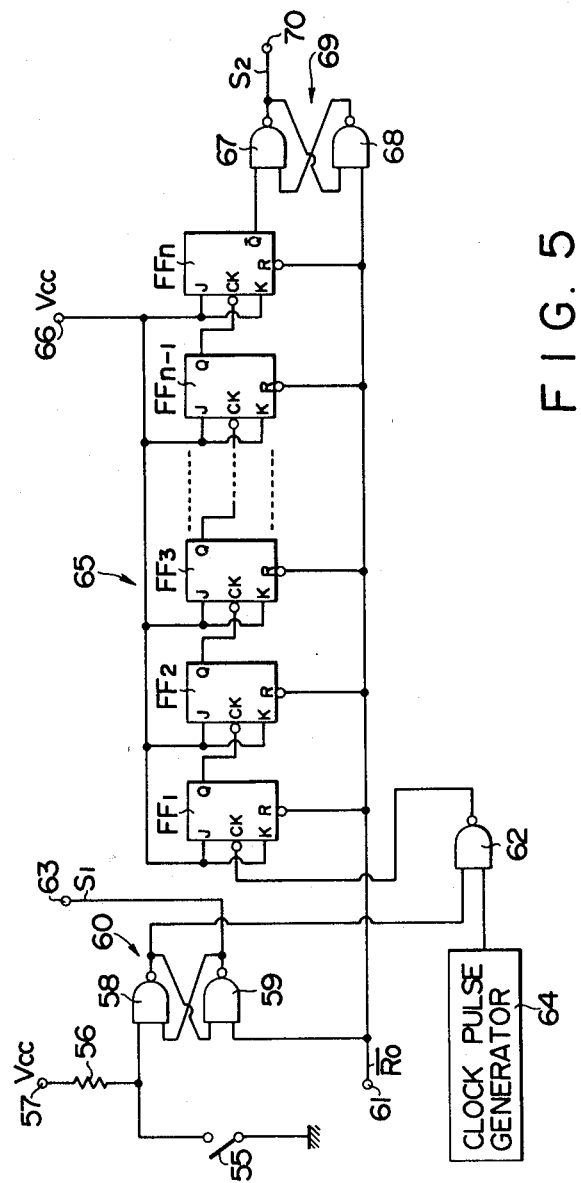
FIG. 4 is a circuit diagram of a control circuit used to control an analog switch shown in FIG. 3.
Figure 5:
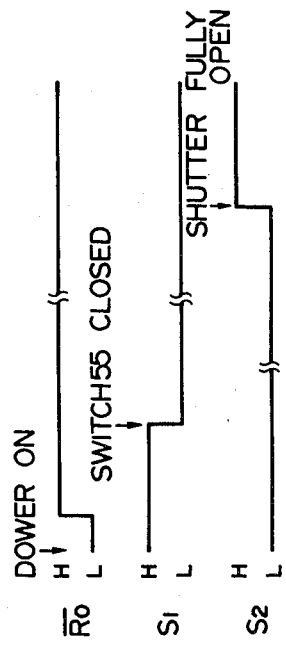
FIG. 5 is a timing chart illustrating various signals appearing in the analog switch control circuit shown in FIG. 4.

FIG. 4 shows one form of analog switch control circuit. In FIG. 4, a switch 55 represents a mechanical switch which is closed in interlocked relationship with the completion of the upward movement of the movable mirror 1 (see FIG. 1) or in response to the initiation of an exposure period. The switch 55 has its one end connected to ground and its other end connected through a resistor 56 to a terminal 47, to which the supply voltage Vcc is applied. In addition, the other end of the switch is connected to one input of NAND gate 58, which forms an RS flipflop 60 together with another NAND gate 59. One input of NAND gate 59 is connected to a terminal 61, to which a reset signal $\overline{Ro}$ is applied. As shown in FIG. 5, the reset signal $\overline{Ro}$ assumes its "L" level for a given time interval when a power switch (not shown) of the camera is turned on. The output terminal of NAND gate 58 is coupled to the other input of NAND gate 59, and is also connected to one input of NAND gate 62 while the output terminal of NAND gate 59 is coupled to the other input of NAND gate 58 and is also connected to a terminal 63, which is adapted to be coupled with the terminal 17 in the circuit of FIG. 3 to supply the control signal S1 to the control input terminal of the analog switches 15, 34. The other input of NAND gate 62 is connected to the output terminal of a clock pulse generator 64. The output terminal of NAND gate 62 is connected to the clock input terminal CK of an initial stage flipflop FF1 of a timer circuit 65, which is formed by a plurality of JK flipflop FF1 to FFn. The flipflops FF1 to FFn-1 have their Q output terminal connected to the clock input terminal CK of the next following flipflops FF2 to FFn, respectively. The J and K input terminals of the flipflops FF1 to FFn are connected to a terminal 66, to which the supply voltage Vcc is applied while their reset terminal R is connected to the terminal 61 to which the reset signal $\overline{Ro}$ is applied. The Q output terminal of the final stage FFn of the timer circuit 65 is connected to one input of NAND gate 67, which forms an RS flipflop 69 together with another NAND gate 68 by having their outputs cross-coupled to their one input. NAND gate 68 has its one input connected to the terminal 61 to receive the reset signal $\overline{Ro}$ therefrom. The output terminal of the RS flipflop 69 is connected to a terminal 70, which is adapted to be coupled to the terminal 29 in the circuit of FIG. 3 to supply the control signal S2 to the control input terminal of the analog switches 26, 46.

The operation of the automatic exposure controller shown in FIG. 3 will now be described together with the operation of the analog switch control circuit shown in FIG. 4. Referring to FIGS. 3 and 4, when the power switch of the camera is turned on, the supply voltage Vcc and the reference voltages VR1–VR5 are supplied, whereby the reset signal Ro is produced and remains at its "L" level for a given time interval and then changes to its "H" level, as shown in FIG. 5. In FIG. 4, the reset signal Ro is effective to reset the RS flipflop 60 to a condition in which the output of NAND gate 58 assumes an "L" level while the output of NAND gate 59 assumes "H" level, thus feeding the control signal S1 which is at the "H" level; from the terminal 63 to the terminal 17 of FIG. 3, as indicated in FIG. 5. At this time, the output of NAND gate 62 is at "H" level, whereby the timer circuit 65 is not activated. Accordingly, the RS flipflop 69 assumes a reset condition in which NAND gate 67 produces an output of "L" level while NAND gate 68 produces an output of "H" level, thus feeding the control signal S2 which is at the "L" level, from the terminal 70 to the terminal 29 of FIG. 3, as indicated in FIG. 5.

Referring to FIG. 3, representing the photocurrent produced by the transducer element 4 by Ii, and a resulting potential developed at the non-inverting input terminal of the operational amplifier 11 by Vi, the operational amplifier 11 produces an output potential VE which is defined as below, $$VE = Vi - \frac{kT}{q} \ln \frac{Ii}{\alpha Is} \qquad (1)$$

where q represents the charge of an electron, k Boltzmann constant, T absolute temperature, α current amplification factor, and Is an inverse saturation current.

When the movable mirror 1 (see FIG. 1) has completed its upward movement and the switch 55 shown in FIG. 4 is closed, the input to NAND gate 58 changes from its "H" level to its "L" level, whereby the RS flipflop 60 reverses its output level, thus causing the control signal S1 to switch to the "L" level. Accordingly, the analog switch 15 (see FIG. 1) which has been closed is now opened. As a consequence, the storage capacitor 16 stores an output voltage VE from the logarithmic compression circuit 14 at the time immediately after the movable mirror 1 has moved upward and which depends on the brightness of an object being photographed as reflected by the first shutter blind. The voltage which is stored across the storage capacitor 16, and which corresponding to the light which is reflected by only the first shutter blind, is fed to one input of the subtraction circuit 24 through the impedance converter formed by the operational amplifier 18, and through the resistor 20. As the first shutter blind begins running, the film surface becomes exposed, so that the output voltage VE from the logarithmic compression circuit 14 varies as the first blind runs, the varying voltage being introduced to the other input of the subtraction circuit 24 through the resistor 22. Therefore, there is provided at the output terminal of the operational amplifier 19 which forms the subtraction circuit 24 a signal indicative of the difference between the output voltage VE from the operational amplifier 11 immediately after the completion of the upward movement of the movable mirror 1 and the output voltage VE from the operational amplifier 11 which varies as the first blind runs, as referenced to the reference voltage VR1. Representing the output voltage from the operational amplifier 18 which is developed in response to the input voltage across the storage capacitor 26 immediately after the completion of the upward movement of the movable mirror 1 by VO, the output voltage V1 from the subtraction circuit 24 will be given as follows, considering the equality of values of resistors 20 to 23:

$$V1 = VR1 - (VO - VE) \qquad (2)$$

Assuming that the brightness of an object being photographed is sufficiently high and accordingly the output voltage VE from the operational amplifier 11 and the reference voltage VR4 applied to the inverting input terminal of the comparator 43 is such that VE<VR4, the comparator 43 produces an output of "L" level. Accordingly, the output of AND gate 45 remains at its "L" level independently from the level of the control signal S2, and hence the analog switch 46 remains closed, thus interrupting the output from the reflectivity correction circuit 50. On the other hand, the control signal S2 remains at its "L" level until the running of the first shutter blind is completed, and hence the inverter 28 produces an output of "H" level to thereby close the analog switch 26. Therefore, when the brightness of an object being photographed is sufficiently high, the output voltage V1 from the subtraction circuit 24 as defined by the equality (2) is supplied through the impedance converter defined by the operational amplifier 30 to the base of the logarithmic expansion transistor 31.

The analog switch 34 remains closed until shortly after the completion of the upward movement of the movable mirror 1, allowing the integrating capacitor 32 to be charged by the supply voltage VR2. Immediately after the completion of the upward movement of the movable mirror, the analog switch 34 is opened in synchronized relationship with the analog switch 15, thus causing the integrating capacitor 32 to maintain the reference voltage VR2. It is to be noted that the reference voltages VR1 and VR2 are related such that VR1<VR2. When the analog switch 34 is opened, the charge stored across the integrating capacitor 32 discharges as a current flow of a magnitude which depends upon the base-emitter voltage VBE of the logarithmic expansion transistor 31. Specifically, representing the base potential of the transistor 31 by VB, the base-emitter voltage VBE is equal to (VB−VE) since the emitter potential is represented by the output voltage VE of the logarithmic compression circuit 14. Accordingly, the collector current Ic of the transistor 31 is given as follows:

$$Ic = \alpha Is \exp \frac{q(VB - VE)}{kT} \qquad (3)$$

It will be seen that shortly after the completion of the upward movement of the movable mirror, there is no change in the output voltage VE from the operational amplifier 11 of the logarithmic compression circuit 14, so that in the equality (2), VO−VE=O and V1=VR1. Since the output voltage V1 of the subtraction circuit 24 represents the base potential VB of the transistor 31, V1=VR1=VB. Accordingly, the collector current Ic of the transistor 31 shortly after the completion of the upward movement of the movable mirror, as defined by the equality (3), can be represented as follows:

$$Ic = \alpha Is \exp \frac{q(VR1 - VO)}{kT} \quad (4)$$

Assuming now that the photocurrent Ii of the transducer element 4 increases to a value which is x times the previous value as the first blind runs, the change $\Delta VE$ in the output voltage from the operational amplifier 11 as compared with the corresponding value assumed immediately after the completion of the upward movement of the movable mirror can be derived from the equation (1) as follows:

$$\Delta VE = VE - VO \quad (5)$$

$$= \left(Vi - \frac{kT}{q} \ln \frac{xIi}{\alpha Is}\right) - \left(Vi - \frac{kT}{q} \ln \frac{Ii}{\alpha Is}\right)$$

$$= -\frac{kT}{q} \ln x$$

Accordingly, from the equation (2), we have $$V1 = VR1 - \frac{kT}{q} \ln x \quad (6)$$

At this time, the analog switch 26 is closed, whereby $V1 = VB$. Thus the equation (6) can be rewritten as follows:

$$VB = VR1 - \frac{kT}{q} \ln x \quad (7)$$

On the other hand, from the equation (5), we have $$VE = VO - \frac{kT}{q} \ln x \quad (8)$$

Substitution of the equations (7) and (8) into the equation (3) yields:

$$Ic = \alpha Is \exp \frac{q(VR1 - VO)}{kT} \quad (9)$$

It will be seen that the equations (9) and (4) are completely identical with each other. This is attributable to the fact that when the output voltage of the subtraction circuit 24, namely, a difference between the value of voltage prevailing at the initiation of running of the first blind under a given brightness of an object being photographed and the value of voltage corresponding to the brightness of an object being photographed which is assumed during the running of the first blind, is applied to the base of the transistor 31, a value of voltage corresponding to the brightness of an object being photographed which is assumed during the running of the first blind is simultaneously applied to the emitter of the transistor 31. Accordingly, there occurs a constant collector current through the transistor 31 which corresponds to the brightness of an object being photographed at the initiation of running of the first blind, independently from any variation in the output from the logarithmic compression circuit 14 which is caused by a change in the amount of light reflected onto the transducer element 4 during the running of the first blind. As a result, the integrating capacitor 32 which has been charged to the reference voltage VR2 discharges through the transistor 31 at a constant rate of discharge current from the initiation to the completion of running of the first blind.

The length of time required for the first shutter blind to complete its running is preset by the timer circuit 65 shown in FIG. 4. Specifically, referring to FIG. 4, when the switch 55 is closed at the time the movable mirror completes its upward movement and the control signal S1 changes to its "L" level, AND gate 62 passes the clock pulse from the clock pulse generator 64 to the timer circuit 65, thus enabling a time counting operation by the timer circuit 65. At the time when the first blind completes its running, the $\overline{Q}$ output from the final stage FFn of the timer circuit 65 changes from its "H" to its "L" level, whereby the output of NAND gate 67 or the RS flipflop 69 changes to its "H" level, delivering the control signal S2 of "H" level at its terminal 70 for application to the terminal 29 of FIG. 3.

When the control signal S2 applied to the terminal 29 changes to its "H" level, the inverter 28 produces an output of "L" level, whereby the analog switch 26 is opened to interrupt the output from the subtraction circuit 24. Thereupon, the output from the subtraction circuit 24 which prevails when the first blind has completed its running, or a change in such output which occurs between the initiation and the completion of running of the first blind, is stored across the capacitor 27. Accordingly, the base potential of the logarithmic expansion transistor 31 is maintained at a constant level which is defined by the capacitor 27 after the first blind has completed its running while the emitter potential of the transistor 31 varies in response to the output voltage from the logarithmic compression circuit 14. In this manner, the base-emitter voltage of the transistor 31 changes in accordance with the brightness of an object being photographed, and accordingly the collector current of the transistor 31 after the shutter blind has become fully open corresponds to the brightness of an object being photographed. The integrating capacitor 32 discharges in accordance with the magnitude of the collector current of the transistor 31 to reduce the voltage developed thereacross, whereby the comparator 36 is operable to reverse its output from its "L" to its "H" level at the time when the voltage across the capacitor falls below the reference voltage VR3, whereupon the transistor 40 in the shutter control circuit 39 which has been maintained conductive since the power switch has been turned on is rendered non-conductive, deenergizing the electromagnet 42 to cause the second shutter blind to run to thereby terminate an exposure.

The described operation takes place when the brightness of an object being photographed is sufficiently high. In this instance, an automatic exposure control through a usual TTL direct photometry as well as an automatic exposure control of a photographing operation with the aid of an electronic flash by utilizing a TTL automatic electronic flash cooperating with the TTL direct photometry camera are both achieved.

As the brightness of an object being photographed diminishes, the influence of a leakage current and a drift is no longer negligible as compared with a photocurrent through the transducer element 4. In this instance, the output voltage VE of the operational amplifier 11 in the logarithmic compression circuit 14 does not vary in proportion to the photocurrent as logarithmically compressed, and hence it is difficult to provide an automatic correction of differential reflectivities of the blind surface and the film surface through the described circuit operation. Since a photographing operation with the aid of an electronic flash takes place in darkness in general, an exposure error may otherwise result if the TTL direct photometry is used with the electronic flash.

In the circuit arrangement of FIG. 3, as the brightness of an object being photographed diminishes and the output voltage VE of the operational amplifier 11 and the reference voltage VR4 applied to the inverting input terminal of the comparator 43 becomes such that VE>VR4, the comparator 43 produces an output of "H" level. At the time when the control signal S2 assumes its "H" level, or when the first blind has completed its running, AND gate 45 produces an output of "H" level, whereby the analog switch 46 is closed to permit the output of the operational amplifier 47 of the reflectivity correction circuit 50 to be passed through the operational amplifier 30, which forms the impedance converter, to be applied to the base of the transistor 31. Since the analog switch 26 is opened in synchronized relationship with the closure of the analog switch 46, the input to the base of the transistor 31 is switched from the output of the subtraction circuit 24 to the output of the reflectivity correction circuit 50. The operational amplifier of the reflectivity correction circuit provides a correction voltage which corrects for an error in the exposure period resulting from the differential reflectivity of the blind surface and the film surface. After the shutter blind has been fully opened, the base potential of the transistor 31 is fixed at the level of the correction voltage supplied from the reflectivity correction circuit 50 while the emitter potential varies in accordance with the brightness of an object being photographed, so that a discharge current from the integrating capacitor 32 flows through the collector in accordance with the brightness of an object being photographed. The semi-fixed resistor 49 in the reflectivity correction circuit 50 is adjusted in accordance with the reflectivity of the film surface. By providing a variable resistance for the resistor 49, the correction voltage developed by the correction circuit 50 can be made so as to correspond to the reflectivity of a particular film which is loaded into the camera. In this manner, immediately after the shutter becomes fully open, the discharge current from the integrating capacitor 32 flows, as the collector current of the transistor 31, in accordance with the amount of reflected light from an object being photographed which is illuminated by the flashlight from the electronic flash. When the voltage across the integrating capacitor 32 falls below the reference voltage VR3 after a given exposure period, the comparator 36 produces an output of "H" level, whereby the electromagnet 42 is deenergized to allow the second blind to run, thus terminating a photographing operation with the aid of the electronic flash through the TTL direct photometry.

Figure 6:
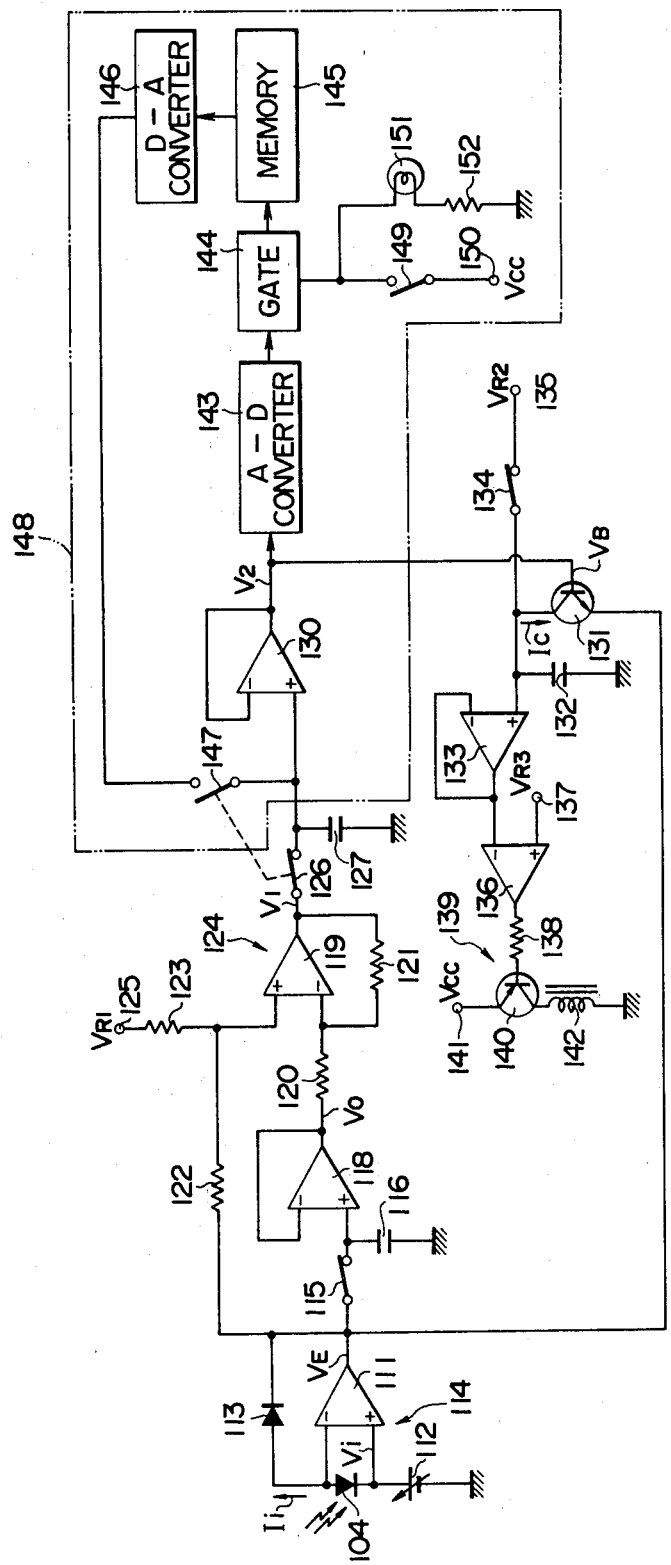
FIG. 6 is a circuit diagram of an automatic exposure controller according to another embodiment of the invention.

As mentioned previously, the film reflectivity varies from film to film in practice. Accordingly, in the automatic exposure control system of the embodiment described above, the variable resistor in the correction circuit must be adjusted so as to correspond to a particular film being used when an object being photographed is under a very dark illumination. FIG. 6 shows another embodiment of an automatic exposure control system in which a correction is automatically made in accordance with the reflectivity of a particular film loaded into the camera when an object being photographed is under a reduced illumination.

Figure 7:
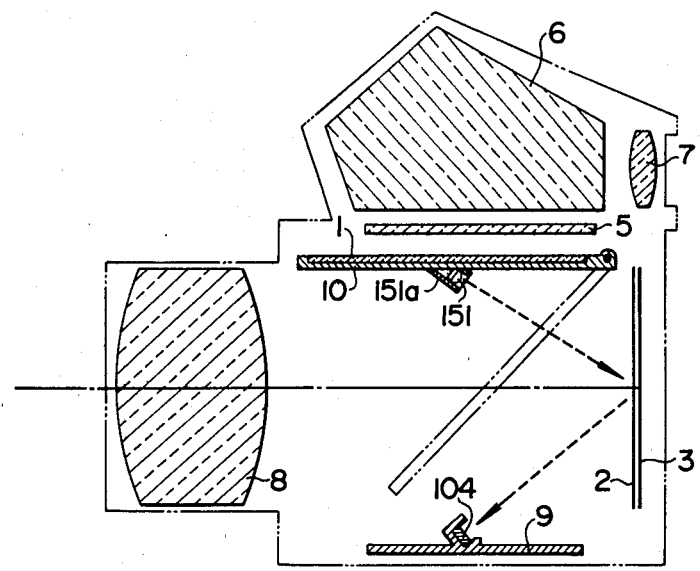
FIG. 7 is a schematic cross section of a camera of TTL direct photometry type which incorporates the automatic exposure controller of FIG. 6.

FIG. 6 is a circuit diagram of such embodiment, which includes a photoelectric transducer element 104 utilized for photometry. As shown in FIG. 7, the transducer element 104 is mounted on a support member 9 and is disposed opposite to a first shutter blind 2 and a film 3 in a camera of TTL direct photometry type. Referring to FIG. 6, the transducer element 104 is connected across both inputs of an operational amplifier 111. Specifically, its cathode is connected to the non-inverting input terminal of the amplifier 111, and is connected to ground through a source of variable voltage 112 which is utilized to preset exposure input information such as film speed. A logarithmic compression diode 113 has its anode connected to the inverting input terminal and its cathode connected to the output terminal of the amplifier 111, whereby a voltage VE which is proportional to the logarithm of the amount of light received by the transducer element 104 is developed at the output terminal of the amplifier 111. The output terminal of the amplifier 111 is connected to one end of a storage capacitor 116 having its other end connected to the ground, through a switch 115 which is closed when a movable mirror 1 (see FIG. 7) has completed its upward movement. The junction between the switch 115 and the capacitor 116 is connected to a non-inverting input terminal of another operational amplifier 118, the inverting input terminal of which is connected to the output terminal thereof, thereby forming an impedance converter having a gain of unity and a high input and a low output impedance. The output terminal of the amplifier 118 is connected through a resistor 120 to an inverting input terminal of a subtraction circuit 124 which is formed by a further operational amplifier 119 and resistors 120 to 123. The amplifier 119 includes a non-inverting input terminal, which is connected through resistor 122 to the output terminal of the amplifier 111 in the logarithmic compression circuit 114 directly. The inverting input terminal of amplifier 119 is also connected through resistor 121 to the output terminal thereof, and the non-inverting input terminal of the amplifier is connected through resistor 123 to a terminal 125, to which a reference voltage VR1 is applied. It is to be noted that resistors 120 to 123 have resistances which are chosen to be R120=R121=R122=R123. In this manner, the subtraction circuit 124 operates to develop at the output terminal of the amplifier 119 a signal indicative of the change between the output voltage VE from the operational amplifier 111 which is applied to its non-inverting input terminal and the output voltage VO from the operational amplifier 118 which is applied to its inverting input terminal, as referenced to the reference voltage VR1.

The output terminal of the amplifier 119 in the subtraction circuit 124 is connected through a switch 126 to one end of a capacitor 127 which has its other end connected to ground. The switch 126 is opened at an exposure interval of about 1/60 second when the first shutter blind completes its running and the shutter is fully open. The junction between the switch 126 and the capacitor 127 is connected to a non-inverting input terminal of an operational amplifier 130, which has its inverting input terminal connected directly to the output terminal thereof to form an impedance converter in the same manner as the operational amplifier 118. The output terminal of the amplifier 130 is connected to the base of an NPN transistor 132 which is used to provide a logarithmic expansion. The transistor 131 has its collector connected to one end of an integrating capacitor 132 which is used to measure an exposure period and having its other end connected to the ground while the emitter of the transistor is connected to the output terminal of the amplifier 111 in the logarithmic compression circuit 114. The collector of the transistor 131 is also connected to a non-inverting input terminal of an operational amplifier 133, which is formed as an impedance converter by having its inverting input and its output terminal connected together in the same manner as the operational amplifiers 118, 130. In addition, the collector of the transistor 131 is connected through a switch 134 to a terminal 135, to which a reference voltage VR2 is applied. The switch 134 is closed when the movable mirror 1 has completed its upward movement. The output terminal of the amplifier 133 is connected to an inverting input terminal of a comparator 136, the non-inverting input terminal of which is connected to a terminal 137, to which a reference voltage VR3 is applied which is used for purpose of level decision. It is to be noted that the reference voltages are related such that VR2>VR3>VR1. The output terminal of the comparator 136 is connected through a resistor 138 to the base of a PNP switching transistor 140 which forms part of a shutter control circuit 139. The transistor 140 has its emitter connected to a terminal 141, to which a supply voltage Vcc is applied, and its collector connected to the ground through an electromagnet 142 which is used to maintain a second shutter blind against running. It will be seen that the circuit arrangement described thus far is generally similar to the automatic exposure control system shown in FIG. 3.

On the other hand, the output terminal of the amplifier 130 is connected to an A-D converter 143, the output terminal of which is connected through a gate circuit 144 to an input terminal of a non-volatile memory 145, the output terminal of which is in turn connected to a D-A converter 146. The output terminal of the D-A converter 146 is connected through a switch 147 to the non-inverting input terminal of the amplifier 130. The switch 147 is ganged with the switch 126, and is adapted to be closed whenever the switch 126 is opened. The loop comprising the amplifier 130, converter 143, gate circuit 144, memory 145, converter 146 and switch 147 represents a film reflectivity storage circuit 148 which stores the reflectivity of a particular film which is loaded into the camera. The gate circuit 144 is associated with a film loading complete switch 149, which is in turn connected to a terminal 150, to which the supply voltage Vcc is applied. The terminal of the switch 149 remote from the terminal 150 is connected to ground through a series combination of a lamp 151 and resistor 152.

Figure 8:
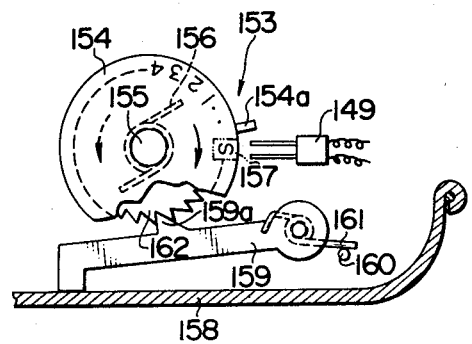
FIG. 8 is a plan view of a film frame counter of the camera shown in FIG. 7.

Referring to FIG. 8, the film loading complete switch 149 is disposed adjacent to a film frame counter 153, and is adapted to be closed at a given position of the frame counter 53 which is less than a frame indication of "1". Specifically, the frame counter 153 includes an indicator disc 54 which is peripherally formed with a projection 154a at a location intermediate a start indication "S" and a frame indication of "1". As the film is being loaded, the rotation of a film winding lever, not shown, causes a support shaft 155 on which the disc 154 is mounted to rotate clockwise against the resilience of a return spring 156 which is disposed on the shaft, thus rotating the disc 154 through an angular increment corresponding to each frame. Consequently, in response to a shutter release and a film winding operation, the projection 154a operates the film loading complete switch 149 for closure at a given angular position before a frame indication of "1" appears through an indicator window 157.

The film loading complete switch 149 is opened again after the projection 154a has moved past it, but a temporary closure of the switch 149 permits the supply voltage Vcc applied to the terminal 150 to be applied to the gate circuit 144, which is then enabled to pass the output from the A-D converter 143 to the memory 145. The gate circuit 144 is operative to pass the output of the A-D converter 143 to the memory 145 each time the film loading complete switch 149 is closed while the film loading complete switch 149 is closed only once during a film loading operation. Thus, the film loading complete switch 149 is closed once by the projection 145a during a film loading operation, and then opens and remains open until another fresh film is loaded after the currently loaded film has been entirely exposed and removed from the camera. When the switch 149 is closed, the gate circuit 144 provides a high output impedance, thereby avoiding any influence upon the content of the memory 145. When removing the exposed film out of the camera and loading a fresh film into it, a rear lid 158 (FIG. 8) is opened. Thereupon, a return member 159 which has been blocked by the lid 158 against rotation is permitted to rotate counterclockwise under the resilience of a return spring 161, which has its one end disposed on the return member 159 and its other end disposed in abutment against a stationary pin 160, thus allowing a pawl 159a formed on the return member 159 to be disengaged from a ratchet 162 which is integral with the disc 154, allowing the ratchet 162 and the disc 154 to rotate counter-clockwise under the resilience of the spring 156 to reset the disc to a position where the start indication of "S" is exposed through the window 157. Subsequently, a fresh film may be loaded into the camera, and by turning a film winding lever, the leader of the film is wound up, and in the course of the frame indication given through the window 157 changing from the start indication "S" to "1", the film loading complete switch 149 is closed again, thus enabling the gate circuit 144.

As the switch 149 is closed, the lamp 151 is energized for illumination. Referring to FIG. 7, the lamp 151 is mounted on the rear surface of a mirror frame 10 on which the movable mirror 1 is mounted by means of a support sleeve 151a. In the up position of the movable mirror 1, as shown, the lamp directs light toward the first blind 2 or the film 3, whereby reflected light impinges upon the transducer element 104. Accordingly, the lamp 151 is energized for illumination during a limited time interval during which the frame indication, given through the window 157 by the film counter 153, changes from the start indication of "S" to a frame indication of "1" during a film loading operation. If a shutter release is operated to cause an exposure of a leader portion at this time, the lamp 151 moves upward together with the movable mirror 1 in the manner indicated in FIG. 7, thus illuminating the film 3 from above, which is exposed as the first blind runs. The resulting reflected light impinges upon the transducer element 104 for photometry.

The operation of the automatic exposure system shown in FIG. 6 will now be described. In response to a shutter release operation, a power switch, not shown, which is ganged with the movable mirror 1 (see FIG. 7), is turned on to feed the supply voltage Vcc and the reference voltages VR1, VR2 and VR3.

Representing the photocurrent produced by the transducer element 104 by Ii and the potential at the non-inverting input of the operational amplifier 111 in the logarithmic compression circuit 114 by Vi in FIG. 6, the output voltage of the operational amplifier 111 will be represented by the output voltage VE defined by the equality (1) as before.

When the movable mirror 1 completes its upward movement, the switch 115 changes from its closed to its open condition, whereby the storage capacitor 116 remains charged to the output voltage VO of the logarithmic compression circuit 114 which is developed immediately after the upward movement of the movable mirror 1 in accordance with the brightness of an object being photographed as reflected by the first shutter blind alone. The voltage across the capacitor 116 which corresponds to the reflected light from only the first blind is passed through the impedance converter, formed by the operational amplifier 118, to be fed to one input of the subtraction circuit 124. As the first blind begins running, the film surface becomes exposed, so that the output voltage VE from the logarithmic compression circuit 114 varies with the running of the first blind, and the varying voltage is fed to the other input of the subtraction circuit 124. As a result, a difference between the output voltage VE from the operational amplifier 111 developed immediately after the completion of the upward movement of the movable mirror 1 and the output voltage VE from the same amplifier 111 which varies with the running of the first blind, as referenced to the reference voltage VR1, is developed at the output terminal of the operational amplifier 119 of the subtraction circuit 124. Representing the first output voltage developed immediately after the upward movement of the movable mirror 1 by VO, the subtraction circuit 124 produces an output voltage V1 which is defined by the equality (2). The switch 126 remains closed until the first blind completes its running, so that the output voltage V1 of the subtraction circuit 124 is fed, through the impedance converter formed by the operational amplifier 130, to the base of logarithmic expansion transistor 131.

The switch 134 remains closed until immediately after the completion of the upward movement of the movable mirror 1 to permit the integrating capacitor 132 to be charged to the reference voltage VR2, and is opened in synchronized relationship with switch 115 immediately after the completion of the upward movement of the movable mirror, thus allowing the integrating capacitor 132 to retain the reference voltage VR2. When the switch 134 is opened, the integrating capacitor 132 discharges as a current which depends on the base-emitter voltage VBE of the logarithmic expansion transistor 131. Specifically, representing the base potential of the transistor 131 by VB, the base-emitter voltage VBE is equal to (VB−VE) since the emitter potential is defined by the output voltage VE of the logarithmic compression circuit 114. Accordingly, a collector current Ic as defined by the equality (3) flows through the transistor 131.

The voltage VE remains unchanged immediately after the completion of the upward movement of the movable mirror, and hence the collector current Ic of the transistor 131 immediately after the completion will be as defined by the equality (4). However, if the photocurrent Ii increases to x times its previous value as the first blind runs, the collector current Ic does not change as will be evident from the equalities (5) to (9). This is attributable to the fact that when the output voltage of the subtraction circuit 124 is applied to the base of the transistor 131 as a difference between the value of voltage prevailing at the initiation of running of the first blind and corresponding to the brightness of an object being photographed and a value of voltage corresponding to the brightness of an object being photographed during the running of the first blind, a value of voltage corresponding to the brightness of an object being photographed during the running of the first blind is simultaneously applied to the emitter of the transistor 131, whereby there occurs a constant collector current through the transistor 131, which corresponds to the brightness at the initiation of running independently from a variation in the output of the logarithmic compression circuit 114 during the running of the first blind which results from a varying amount of reflected light incident upon the transducer element 104. Thus, the integrating capacitor 132 which has been charged to the reference voltage VR2 discharges through the transistor 131 at a constant rate of discharge current from the initiation to the completion of running of the first blind.

As the exposed film area increases after the initiation or running of the first blind, the output voltage VE of the logarithmic compression circuit 114 decreases gradually as does the emitter potential of the logarithmic expansion transistor 131, but where the exposure period is established for a high speed shutter operation less than 1/60 second during which the shutter will be fully open, the switch 126 remains closed, whereby the output voltage V1 from the subtraction circuit 124 is applied as the base potential VB of the transistor 131, thus reducing the base potential by the same amount as the reduction in the emitter potential, with result that the collector current Ic of the transistor 131 will be as defined by the equality (4). Thus, the charge stored across the integrating capacitor 132 discharges at a constant current rate, providing a substantially stored value photometry. As the voltage across the integrating capacitor 132 falls below the reference voltage VR3, the output of the comparator 136 changes from its "L" to its "H" level, whereby the transistor 140 in the shutter control circuit 39a which has been maintained conductive since the power switch has been turned on a is rendered non-conductive, deenergizing the electromagnet 142 to allow the second shutter blind to run to thereby terminate an exposure.

The described operation occurs for a high speed operation in which an exposure period is less than 1/60 second. The operation which occurs for a low speed shutter operation corresponding to an exposure period greater than 1/60 second will now be described.

During initial 1/60 second after a shutter release during which the first shutter blind completes its running to make the shutter fully open, substantially a stored value photometry takes place as in a high speed shutter operation. When the first blind completes its running, the switch 126 is opened to disconnect the output of the subtraction circuit 124. Then the capacitor 127 retains the output of the subtraction circuit 124 when the first blind has completed its running, namely, a change in the output between the initiation and the completion of running of the first blind. Assuming for the moment that the film reflectivity storage circuit 148 is absent, and that the voltage across the capacitor 127 is applied through the operational amplifier 130 to the base of the logarithmic expansion transistor 131, the base potential of the transistor 131 will be maintained at a constant level stored across the capacitor 127 after the first blind has completed its running. On the other hand, the emitter potential of the transistor 131 will change in accordance with the output voltage from the logarithmic compression circuit 114, so that the base-emitter voltage of the transistor 131 will vary in accordance with the brightness of an object being photographed. Accordingly, the magnitude of the collector current of the transistor 131 will correspond to the brightness of an object being photographed after the shutter is fully open. The integrating capacitor 132 discharges in accordance with the collector current of the transistor 131, thereby reducing the voltage thereacross. Hence, the output of the comparator 136 changes from its "L" level to its "H" level at the time the voltage across the capacitor falls below the reference voltage VR3, whereupon the transistor 140 in the shutter control circuit 139 is rendered non-conductive to deenergize the electromagnet 142, allowing the second blind to run to terminate an exposure.

When an exposure period is greater than 1/60, there is no problem whatsoever with the described operation as long as the brightness of an object being photographed is sufficient. However, if the brightness is too low, the influence of a leakage current and drift becomes non-negligible as compared with the magnitude of the photocurrent produced by the transducer element 104. In such situation, the output voltage VE of the amplifier 111 in the logarithmic compression circuit 114 will no longer vary in proportion to the logarithm of the photocurrent, thus making it difficult to achieve an automatic correction for the differential reflectivity of the blind surface and the film surface through the described circuit operation. Since a photographing operation with the aid of an electronic flash generally takes place in darkness, an exposure error would otherwise occur with the TTL direct photometry for determination of the flashlight from the electronic flash.

To accommodate for this, in the circuit arrangement of FIG. 6, there is provided the film reflectivity storage circuit 148. At the time when the first blind completes its running, the switch 126 is opened while the switch 147 in the storage circuit 148 is closed in interlocked relationship therewith. In this manner, the content stored in the memory 145 is converted into an analog potential through the D-A converter 146 and is then applied through the amplifier 130 to the base of the logarithmic expansion transistor 131. It will be recalled that the content stored in the memory 145 represents a voltage corresponding to the reflectivity of a particular film loaded into the camera. This voltage is originally stored in digital form during a film loading operation, and is retained until the entire exposure of the film is finished.

As a film is loaded into the camera and an idling or leader portion of the film is wound up, the film loading complete switch 149 is closed at a given location intermediate the start indication "S" and the frame count of "1" indicated by the film frame counter 153. The closure of the switch 149 automatically establishes an exposure period greater than 1/60 second. Usually the film is wound up by performing a so-called idling operation until the frame indication of "1" appears. Hence, a shutter release which occurs when the switch 149 is closed causes the power switch to be turned on in interlocked relationship with the movable mirror, whereby the supply voltage Vcc and the reference voltages VR1 to VR3 are applied, thus causing an illumination of the lamp 151 which is disposed on the rear surface of the movable mirror 1. When the lamp 151 emits light, the transducer element 104 receives, for purpose of photometry, the reflection by the film surface of either the combination of the light emitted by the lamp 151 and the taking light which passes through the taking lens 8 or the light emitted by the lamp 151 alone. It will thus be seen that if the idling operation takes place in darkness or while a lens protective cap is held closed, the emission of light by the lamp 151 permits the transducer element 104 to receive an amount of light which exceeds a given value.

Representing the output voltage VE from the amplifier 111 of the logarithmic compression circuit 114 when the shutter is fully open and reflected light from the film surface alone is determined by the transducer element 104 by VEF, it will be seen that the difference (VEF−VO) where the voltage VO represents that across the storage capacitor 116 is inherent to the difference in the reflectivity between the blind surface and the film surface. Thus, representing the photocurrent produced by the transducer element 104 when it receives the reflection from only the blind surface by Ii and the photocurrent produced by the transducer element 104 when it receives the reflection from only the film surface by IiF and assuming a ratio of 1:$\beta$ for the reflectivity of the blind surface to the film surface, it follows that IiF=$\beta$Ii. Hence we have from the equation (1), $$\text{V}EF - \text{V}O = -\frac{kT}{q}\ln\frac{\beta Ii}{\alpha Is} - \left(-\frac{kT}{q}\ln\frac{Ii}{\alpha Is}\right) \quad (10)$$

$$= -\frac{kT}{q}\ln\beta$$

Hence, when the shutter is fully open, the amplifier 119 of the subtraction circuit 124 provides an output voltage V1 which is defined as follows:

$$\text{V}1 = \text{V}R1 - \frac{kT}{q}\ln\beta \quad (11)$$

It will be evident from the equation (11) that when the shutter blind is fully open, the output voltage V1 of the amplifier 119 has a value which depends on the ratio of the reflectivity of the blind surface to the reflectivity of the film surface. Since the switch 126 is opened when the shutter is fully open, the output voltage V1 of the amplifier 119 is stored by the capacitor 127, and is also fed through the amplifier 130 to be applied to the base of the transistor 131. In addition, the voltage V1 is fed to the A-D converter 143 of the film reflectivity storage circuit 148 to be converted into a corresponding digital value, which is stored in the memory 145 through the gate circuit 144 which is then enabled by the closure of the film loading complete switch 149. Thus it will be seen that a voltage corresponding to the film reflectivity is stored in the memory 145 at the beginning of a film winding operation. The stored digital value is converted into a corresponding analog value by the D-A converter 146 and is applied to the non-inverting input terminal of the amplifier 130 through the switch 147 which is closed as the switch 126 is opened. After the voltage representing the film reflectivity has been stored in the memory 145, a next following film frame winding operation opens the switch 149 to disable the gate circuit 144, thus preventing the lamp 151 from being energized for the next shutter release. This is because it is unnecessary to render the gate circuit 144 conductive to enable the output voltage from the amplifier 119 to be stored for another photographing operation since information concerning the reflectivity of a particular film loaded into the camera is already stored in the memory 145.

After the completion of a film loading and of an idling operation to wind up the leader portion of the film to present the frame indication of "1" on the film frame counter 153 through the window 157, a user may direct the camera toward an object being photographed with a positive intention of taking a picture thereof. When a shutter release takes place, if the exposure period is greater than 1/60 second, the output voltage V1 of the subtraction circuit 124 and the output voltage VE of the logarithmic compression circuit 114 will define the base-emitter voltage of the logarithmic expansion transistor 131 to provide a substantially stored value photometry until the shutter becomes fully open. However, after the shutter is fully open, the switch 126 is opened while the switch 147 is closed, so that the voltage stored in the memory 145 is derived at the output terminal of the amplifier 130 after its conversion into a corresponding analog value by the D-A converter 146. The voltage V2 developed at the output terminal of the amplifier 130 is equal to the voltage V1 defined by the equality (11), and is a voltage of a constant value which depends on the ratio of the reflectivity of the blind surface to the reflectivity of the film surface.

In this manner, the base potential VB of the transistor 131 is automatically fixed to the magnitude of the voltage supplied from the film reflectivity storage circuit 148 after the shutter is fully open, while the emitter potential varies in accordance with the brightness of an object being photographed, whereby a discharge current from the integrating capacitor 132 flows through the collector thereof in accordance with the brightness of an object being photographed. For example, if the electronic flash is activated after the shutter is fully open, the brightness of an object being photographed which is illuminated by the flashlight from the electronic flash is determined by the transducer element 104 to cause a rapid fall in the output voltage VE from the amplifier 111. Accordingly, the emitter potential of the transistor 131 also falls down rapidly. However, since the base potential VB of the transistor 131 is fixed to the value stored in the storage circuit 148, the collector current of the transistor 131 varies in proportion to the brightness of an object being photographed, thus enabling TTL direct photometry. Thus the voltage across the capacitor 132 decreases with the flow of the collector current through the transistor 131, allowing the second blind to run at a given exposure period in the similar manner as mentioned above, thus terminating a photographing operation with the aid of the electronic flash through TTL direct photometry.

To summarize, where an object being photographed is disposed in darkness or where the light from an object being photographed changes before the shutter becomes fully open, the output voltage V1 from the subtraction circuit 124 does not provide a voltage which properly corresponds to the film reflectivity, and hence at a point in time before the frame indication of "1" is given during a film winding operation which occurs by an idling operation occurring immediately after a film has been loaded, the lamp 151 is energized for illumination in order to derive a voltage dependent on the film reflectivity from the subtraction circuit 124 for storage in the memory 145. For a next and a subsequent shutter release, a voltage corresponding to the stored value which depends on the film reflectivity is fed to the logarithmic expansion transistor 131 after the shutter is fully open. The determination of the light emitted by the lamp 151 is performed by the photoelectric transducer element 104 which is provided for the photometry of the brightness of an object being photographed, thus dispensing with a separate photoelectric transducer element to achieve the correction for the film reflectivity.

It is to be understood that the provision of the lamp 151 shown in the described embodiment is not essential. Specifically, an idling operation of the camera may be performed while directing it toward a bright object during the time the leader portion of film is wound up from the start indication of "S" to a point preceding the frame indication of "1". At this time, a voltage which depends on the ratio of the reflectivity of the blind surface to the reflectivity of the film surface is stored in the memory 145, and can be utilized in subsequent shutter release operations by being applied to the base of the transistor 131 after the shutter is fully open, thus permitting an exposure control through TTL direct photometry in the same manner as mentioned above.

In the described embodiments, the storage capacitor 16 or 116 has been charged at the completion of the upward movement of the movable mirror. However, where the movable mirror is formed by a half mirror, it is possible to charge the storage capacitor to a voltage corresponding to the brightness of an object being photographed as reflected by the blind surface even before the movable mirror moves upward.

What is claimed is:

1. Automatic exposure controller for a camera of TTL direct photometry type including a photoelectric transducer element which effects photometry of light from an object being photographed which light passes through a taking lens of the camera, is reflected by a first blind surface and a film surface which becomes exposed as the first blind runs and impinges on the transducer element, a proper exposure period being determined in accordance with a photometric output from the photoelectric transducer element, the controller comprising:

(A) a logarithmic compression circuit for producing a voltage which represents a logarithmic compression of a photocurrent produced by the photoelectric transducer element;

(B) a storage circuit for storing an output voltage from the logarithmic compression circuit which corresponds to light reflected from only the first blind surface at the initiation of running of the first blind;

(C) a subtraction circuit for detecting a difference between the voltage stored in the storage circuit and the output voltage from the logarithmic compression circuit;

(D) a logarithmic expansion circuit for producing an output current which:

(1) varies in response to both an output voltage from the subtraction circuit and an output voltage from the logarithmic compression circuit during a first exposure period which starts at the initiation of a shutter release operation and ends when the shutter is fully open, said output voltage from said subtraction circuit being permitted to vary as a function of said output voltage from said logarithmic compression circuit during said first exposure period; and thereafter (2) varies in response to both a voltage which is derived from the subtraction circuit and which remains fixed once the shutter is fully open and to the output voltage from the logarithmic compression circuit during a second exposure period which follows said first exposure period;

(E) an integrating circuit for integrating an output current from the logarithmic expansion circuit to determine an exposure period; and (F) a shutter control circuit for terminating an exposure operation in response to an output of the integrating circuit which reaches a given value.

2. Automatic exposure controller according to claim 1, further including a film reflectivity correction circuit connected between the subtraction circuit and the logarithmic expansion circuit and operable whenever the brightness of an object being photographed is below a predetermined value to apply a voltage which is established in accordance with a film reflectivity to the logarithmic expansion circuit in substitution for the output voltage of the subtraction circuit at the time the shutter is fully open.

3. Automatic exposure controller according to claim 1, further including a film reflectivity storage circuit connected between the subtraction circuit and the logarithmic expansion circuit and operable for an exposure period greater than the predetermined time interval required for the shutter to become fully open to develop and store a film reflectivity dependent voltage in the form of an output voltage from the subtraction circuit which is obtained by photometry of reflected light from the film surface when a leader portion of the film loaded is exposed by an idling operation, the stored voltage loaded being applied to the logarithmic expansion circuit in substitution for the output voltage of the subtraction circuit at the time when the shutter is fully open as long as the film remains loaded in the camera.

4. Automatic exposure controller according to claim 1 in which the logarithmic compression circuit comprises a transistor including a base to which the output voltage of the subtraction circuit is applied and an emitter to which the output voltage of the logarithmic compression circuit is applied.

5. Automatic exposure controller according to claim 3 in which the film reflectivity storage circuit comprises an A-D converter for converting an output voltage from the subtraction circuit into a corresponding digital value, a film loading complete switch which is closed when a frame indication of a film frame counter is less than "1", a lamp responsive to the closure of the switch to emit light for illuminating the film surface which is exposed when the shutter is fully open, a memory for storing an output of the A-D converter when the film loading complete switch is closed, a D-A converter for converting an output from the memory into a corresponding analog value, and a switch through which an output of the D-A converter is applied to the logarithmic expansion circuit at the time the shutter is fully open.

6. Automatic exposure controller according to claim 1, wherein said logarithmic expansion circuit varies in response to the simultaneous application of said output voltage from said subtraction circuit and said output voltage of said logarithmic compression circuit during said first exposure period and varies in response to the simultaneous application of said derived voltage and said output voltage from said logarithmic compression circuit during said second exposure period.

* * * * *